United States Patent

Lax

[15] 3,655,986
[45] Apr. 11, 1972

[54] LASER DEVICE
[72] Inventor: Benjamin Lax, Newton, Mass.
[73] Assignee: Massachusetts Institute of Technology, Cambridge, Mass.
[22] Filed: Oct. 20, 1964
[21] Appl. No.: 405,041

[52] U.S. Cl. ......................... 250/199, 313/108 D, 331/94.5
[51] Int. Cl. .................................................. H04b 9/00
[58] Field of Search ............ 250/199; 313/87, 80, 101, 110, 313/108 D, 111; 178/5.4, 7.8, DIG 2; 350/6, 7; 331/94.5

[56] References Cited

UNITED STATES PATENTS

| | | | |
|---|---|---|---|
| 2,589,704 | 3/1952 | Kirkpatrick | 250/199 UX |
| 2,683,794 | 7/1954 | Briggs | 250/199 UX |
| 2,598,941 | 6/1952 | Roth | 313/87 |
| 3,210,594 | 10/1965 | Forrer | 313/87 |
| 3,234,329 | 2/1966 | Eisner | 178/DIG. 2 |
| 3,248,669 | 4/1966 | Dumke | 250/199 UX |
| 3,275,746 | 9/1966 | Beltrami | 250/199 UX |
| 3,393,373 | 7/1968 | Stimler | 331/94.5 |

Primary Examiner—Robert L. Griffin
Assistant Examiner—Albert J. Mayer
Attorney—Melvin R. Jenney, Richard R. Hildreth, Edward D. Thomas, Robert J. Horn, Jr., Robert T. Dunn and Thomas Coach

[57] ABSTRACT

A moving and/or modulated beam of electromagnetic radiation is produced employing a body of selected semiconductor material with means on one side for launching a beam of high intensity electrons against the material, so as to produce therein a sufficient population of elevated energy states that transitions of the elevated energy states to lower energy states is accompanied by the production of an intense beam of electromagnetic radiation which issues from the semiconductor body.

6 Claims, 14 Drawing Figures

Patented April 11, 1972
3,655,986
4 Sheets-Sheet 1
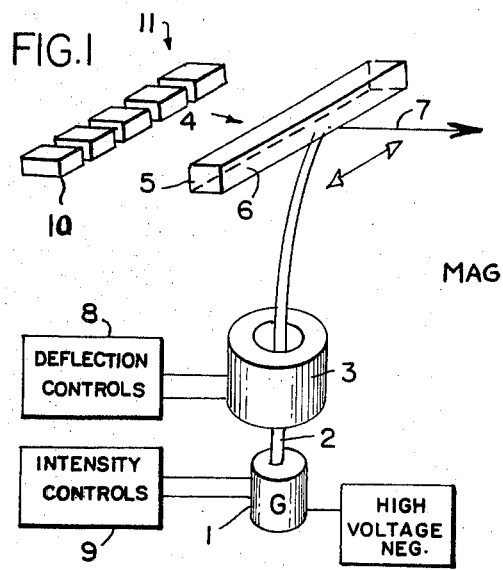
FIG.1
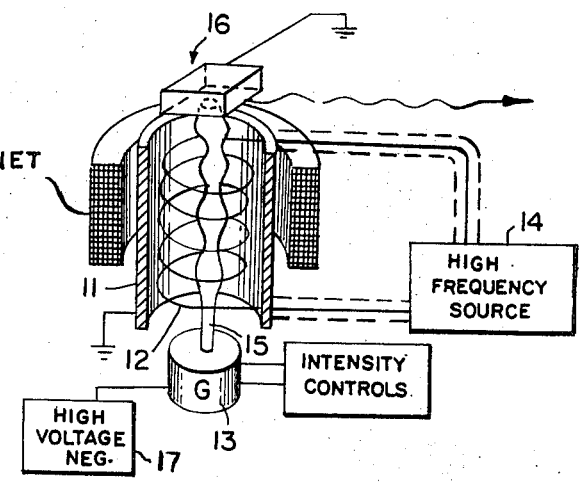
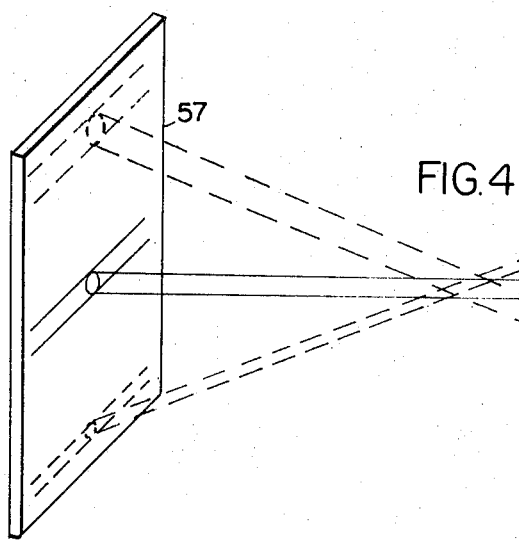
FIG.4
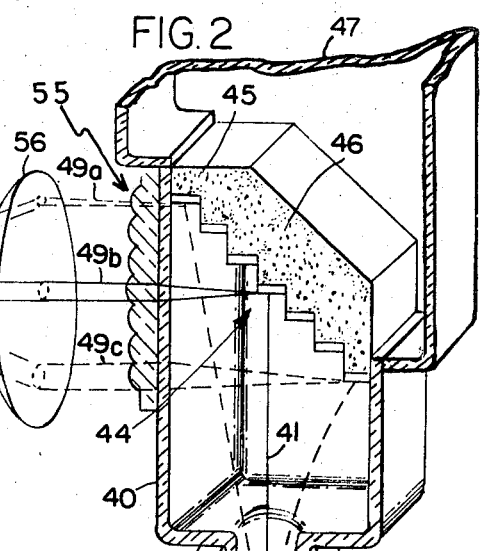
FIG.2
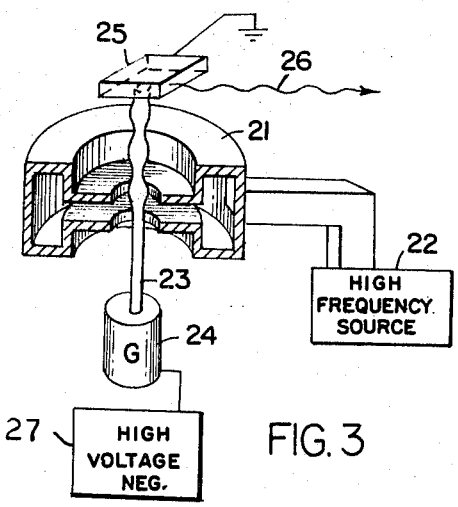
FIG.3
INVENTOR
BENJAMIN LAX
BY, *Robert T Dunn*
ATTORNEY

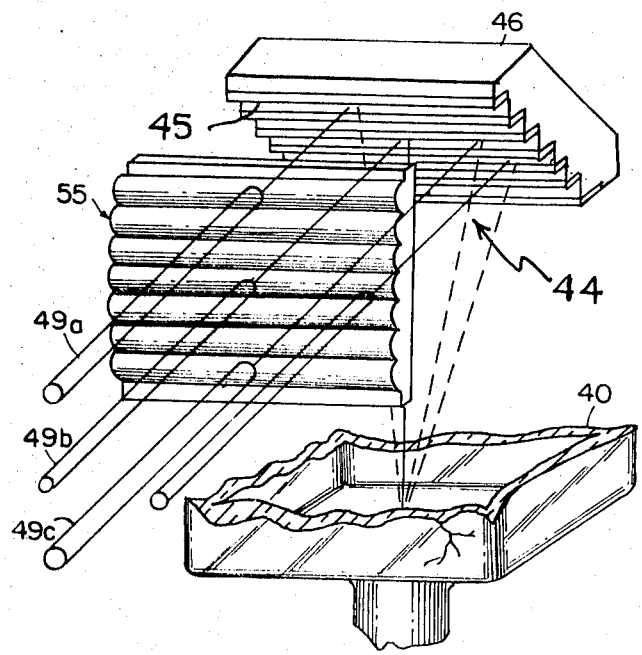
FIG. 5
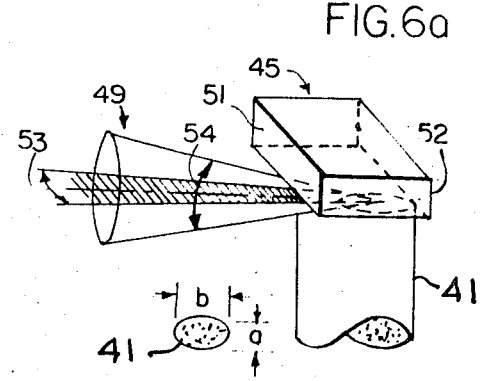
FIG. 6a
FIG. 6b
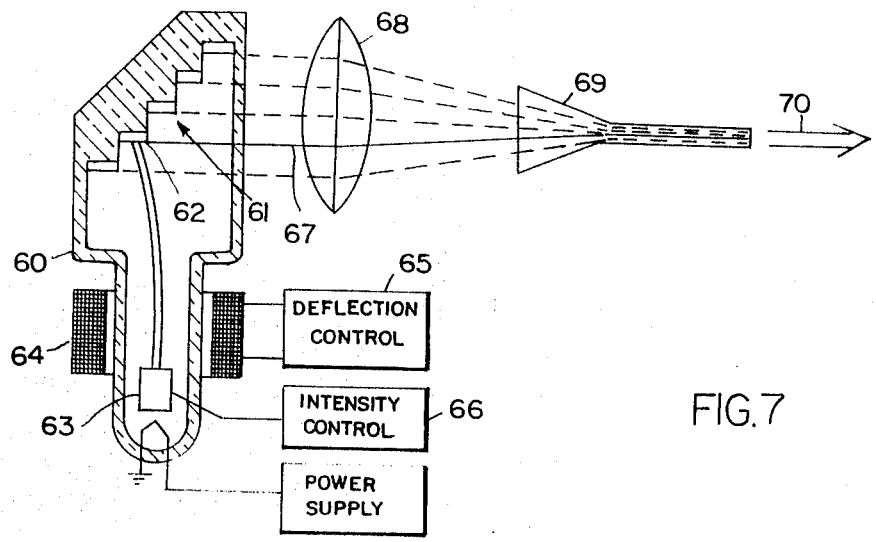
FIG. 7
INVENTOR
BENJAMIN LAX
BY, *Robert T Dunn*
ATTORNEY

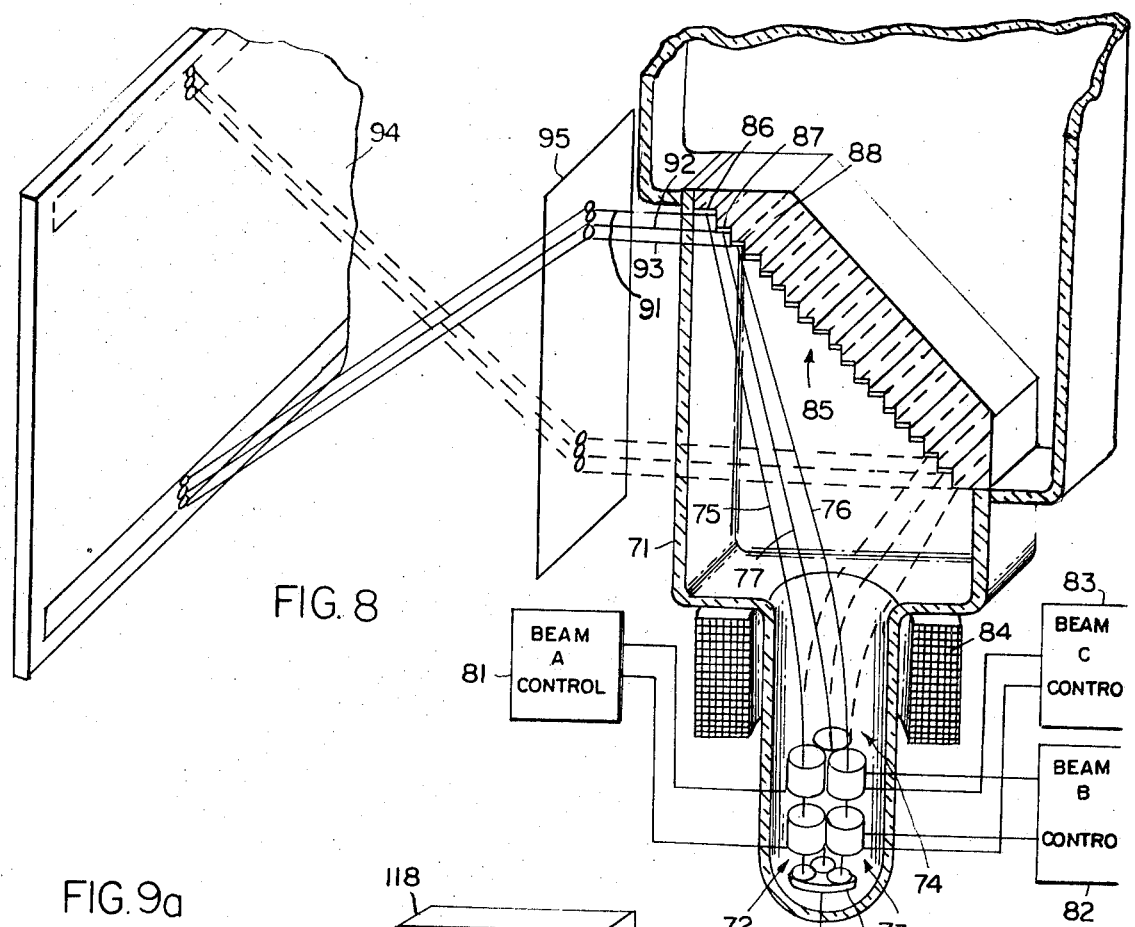
FIG. 8
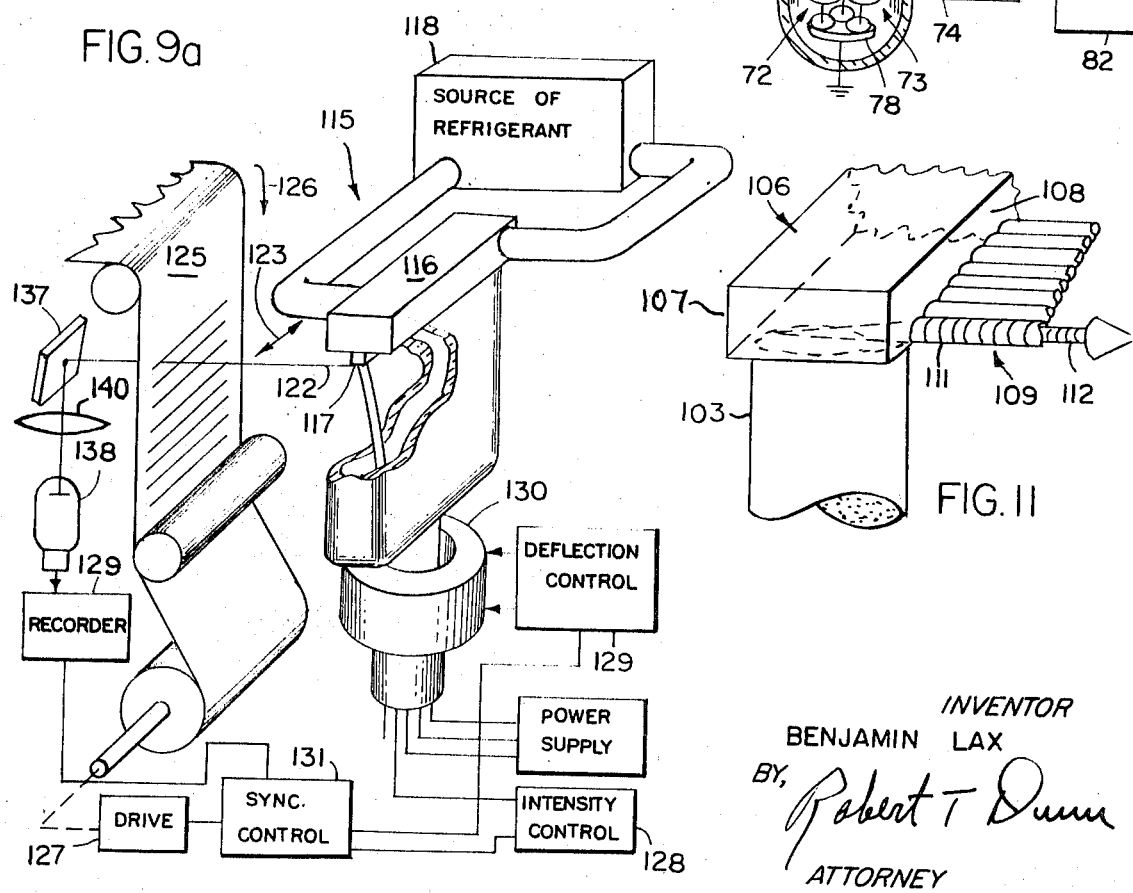
FIG. 9a
FIG. 11
INVENTOR
BENJAMIN LAX
BY, *Robert T Dunn*
ATTORNEY

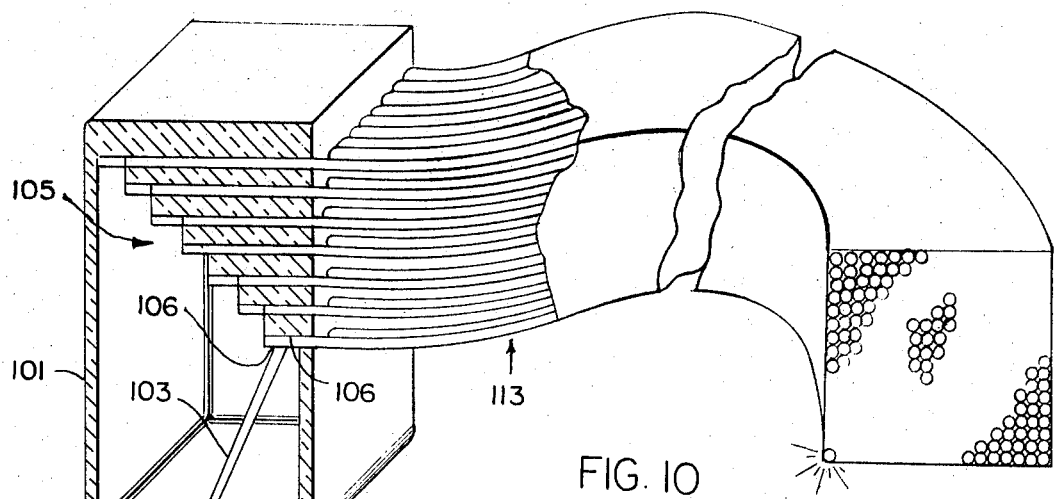
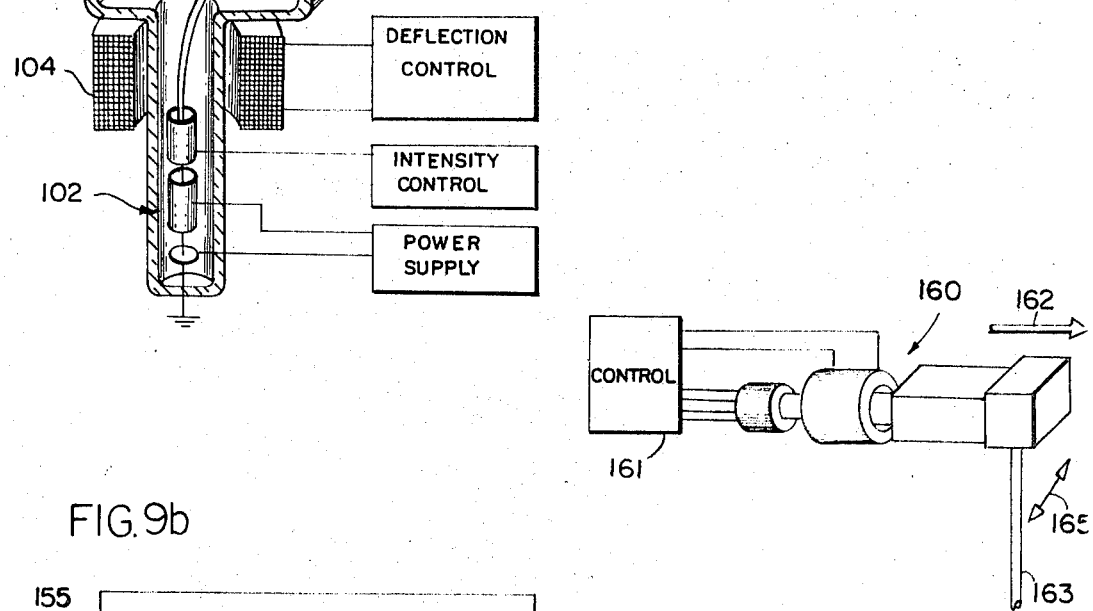
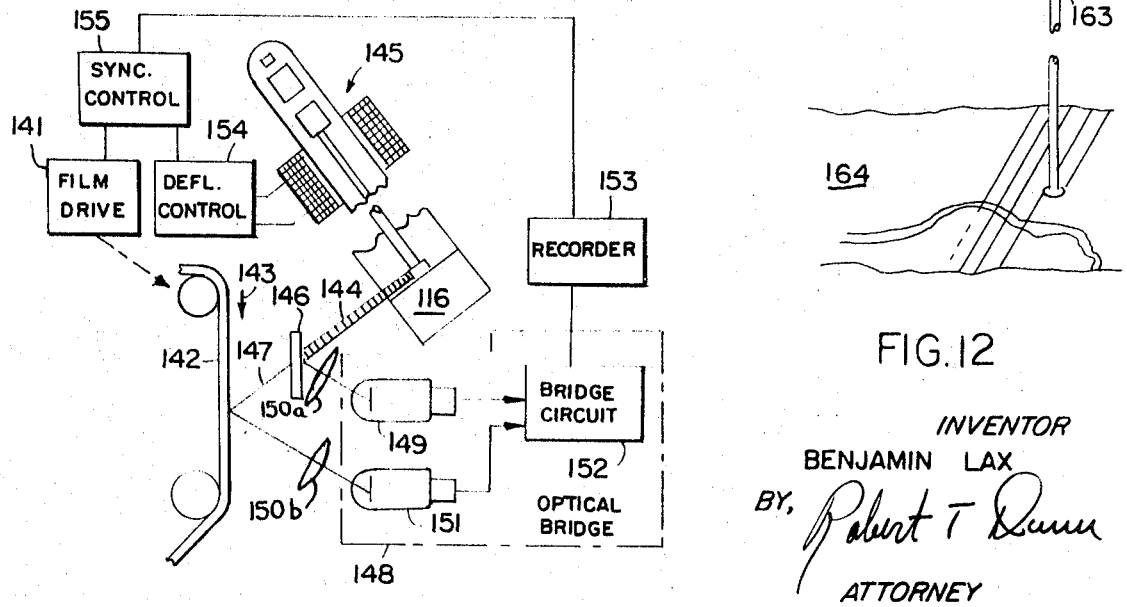
INVENTOR
BENJAMIN LAX
BY, Robert T Dunn
ATTORNEY

LASER DEVICE

This invention relates to laser devices and more particularly to devices wherein lasering action or strong emission of radiation occurs within a semiconductor material by virtue of an inverted or near inverted population of energy states within the semiconductor material produced by the impingement thereon of a high intensity flow of electrons.

Spontaneous emission of radiation and in fact a lasering action will occur in semiconductor materials in which electron-hole pairs are generated by means of a beam of high energy electrons. For example, it has been observed that line narrowing occurs in the radiation generated by a beam of high energy electrons impinging upon a body of CdS. In addition, laser action has been observed in InSb and InAs semiconductor materials enclosed by an optical cavity and which are subjected to a beam of high energy electrons. Where such a lasering action occurs, as in the InSb and InAs, the direction of maximum intensity of radiation is determined by the direction of the optical cavity. The line narrowing in CdS mentioned above was reported in the "Symposium on Radiative Recombination in Semiconductors," Paris, July 28, 1964 and the observation of laser action in InSb and InAs reported by C. Benoit a la Guillaume and T. M. DeBever at the same symposium in Paris July 28, 1964. Lasering action in GaAs has also been observed and reported by C. E. Hurwitz and R. J. Keyes in *Applied Physics Letters*, Oct. 1, 1964.

The present invention contemplates a variety of structures producing a scanning and/or modulated beam of high intensity electromagnetic radiation from a body or bodies of semiconductor material in response to a scanning and/or modulated flow of high intensity electrons directed to the bodies of semiconductor material. Various embodiments include optical cavities enclosing the semiconductor bodies to induce lasering and the production of highly directional coherent radiation. Some of the objects of the invention are set forth below.

It is one object of the present invention to provide a device producing a narrow beam of intense electromagnetic radiation which scans a target.

It is another object to provide a device producing an intense beam of electromagnetic radiation which is modulated at high frequency including microwave frequencies.

It is another object to produce a narrow beam of relatively intense radiation emanating from a source such that the beam moves relative to the source.

It is another object to provide a laser device producing a scanning beam of intense radiation in which at least one dimension of the scanning is accomplished without moving parts or apparatus.

It is another object to provide a laser device producing a relatively intense beam of radiation which moves relative to the laser device.

It is another object to provide a device producing a narrow beam of intense radiation which scans a two dimensional pattern.

It is another object to provide a laser device producing a visible beam of a relatively intense radiation which is modulated with information signals and scans a two dimensional pattern.

It is another object to provide a laser device producing intense radiation which when projected on a diffusely reflecting or fluorescent surface produces an image thereon.

It is another object to provide a laser device producing an intense beam of radiation of multiple colors which when projected on a diffusely reflecting or fluorescent surface produces a colored image thereon.

It is another object to provide a device producing a laser beam which is modulated with video signals and scans a TV type raster on a target.

It is another object to provide a system including laser means for illuminating a target or scene, camera means for recording the image of the illuminated target and projection means for displaying the recorded image.

It is another object to provide means producing an intense laser beam carried aboard a moving vehicle for scanning the scene moving past said vehicle by causing said beam to move relative to said vehicle.

It is another object of the present invention to provide means for producing and directing laser beams, generated either simultaneously or sequentially, along a common path to produce an exceptionally intense beam of substantially continuous radiation.

In accordance with principal features of the present invention, a controlled flow or beam of high energy electrons is directed to a body or bodies of semiconductor material producing at least one filament of electromagnetic radiation within the bodies, the electron beam being controlled so that the position of the filament and/or the intensity of the filament changes in synchronism with position and/or intensity changes of the electron beam. In some embodiments, where a greater intensity, coherence and narrower beam of electromagnetic radiation is desired each of the bodies of semiconductor is enclosed by an optical cavity so that lasering occurs within the semiconductor.

It is a general feature of one type embodiment to dispose a plurality of bodies or chips of semiconductor material in a regular spaced relationship or array within an evacuated enclosure and to direct a scanning beam of electrons to the array so that filaments of electromagnetic radiation generated by the electron beam move throughout the array in the same fashion as the electron beam. In similar embodiments, intensity and directivity of the electromagnetic radiation is increased by causing lasering action within the semiconductor material through the use of optical cavities enclosing the material. Furthermore, in some embodiments, the intensity of the electromagnetic radiation is modulated by modulating the intensity of the electron beam.

In a similar embodiment including the above features, the bodies of semiconductor material are arranged in a three dimensional array similar to the steps on a staircase. For example, the bodies are elongated strips of semiconductor arranged parallel to each other and staggered in position like the steps on a staircase or the bodies are chips arranged in parallel rows staggered in position like the steps on a staircase. In these embodiments, it is convenient to cause the electron beam to sweep the array by scanning the semiconductor material defining each step in sequence; however, other and different arrays and modes of electron beam scan may be employed depending upon the purpose and use intended.

It is an additional feature of similar embodiments to modulate the intensity of the electron beam with video signal and to cause the electron beam to scan a TV type raster on the array of semiconductor rows or strips so that the laser beam scans a video image on the target to which it is directed. It is an additional feature of a similar embodiment to employ a plurality of different types of semiconductor material producing different wavelength radiation; for example, to employ different types of semiconductor material selected to produce visible radiation in the primary colors and to arrange the chips or strips of these materials in the stair-like array in a repeated sequence, then to direct an electron beam or beams to the array of semiconductor modulated in accordance with primary color video signals. The scanning light beam issuing from the array when directed to a target screen will form a colored video image on the screen.

Embodiments of the invention employing the stair-like array of semiconductor material in some cases produces more efficient operation when equipped with an array of cylindrical lenses, each lens aligned with radiation from a different one of the rows or strips. These lenses serve to reduce the spread of the beam of radiation emanating from each of the rows as the row is swept by the electron beam and can be located within or without the evacuated envelope enclosing the array and beam. In some applications it is desirable to employ light tubes (fiber optics) instead of the array of lenses. In this case, a row of light conducting fibers or tubes may be disposed abutting one edge of each row or strip of semiconductor material from which the light beam emerges. Thus, the optical fibers operate as lenses and when arranged in a tight bundle preserving the initial relative position of each fiber, will project an image corresponding to signals applied to the electron beam.

A light tube also serves to concentrate laser radiation from the array of semiconductor. For example, the scanning laser beam can be directed by a lens system to one end of a light tube which is of substantially smaller crosswise dimensions then the area scanned by the laser beam. Thus, there emerges from the other end of the light tube a continuous non-scanning very intense laser beam. In this embodiment, the semiconductor material in the array is energized by a very intense electron beam, more intense than the material could tolerate if the electron beam were directed continuously to the same spot.

Similar embodiments of the invention are also described herein for producing a modulated laser beam by employing features of familiar microwave electron discharge devices to drive and modulate the electron flow which produces the radiation. One of these embodiments includes a traveling wave tube structure in which the body of semiconductor material is located in the position normally occupied by the electron beam collecting electrode and so the beam, which is modulated at microwave frequency by exchange of energy with a high frequency wave conducted by the slow wave structure in the tube produces a modulated intensity laser beam. Another embodiment of this type includes a klystron type structure for modulating the beam of electrons. In this, a beam of electrons is injected through a wave reentrant cavity energized by a high frequency source to the body of semiconductor. As a result, the laser beam is modulated at the frequency of the source.

Other objects and features of the invention will be apparent from the following description taken in conjunction with the figures in which:

FIG. 1 illustrates a simple embodiment for directing an electron beam to a strip or row of bodies of semiconductor material and for sweeping the electron beam to produce a moving beam of laser radiation;

FIG. 2 illustrates an embodiment employing a traveling wave structure producing a modulated laser beam;

FIG. 3 illustrates an embodiment employing a klystron type structure for producing a modulated laser beam.

FIGS. 4 and 5 illustrate different views of a cathode ray tube with a beam target comprising a step-like array of strips or rows of semiconductor material for producing an intense beam of laser radiation which sweeps a target in two dimension defining an illuminated raster thereon;

FIGS. 6a and 6b illustrate some detailed features of the electron beam and the laser beam generated within the semiconductor body;

FIG. 7 illustrates a system including a cathode ray tube such as illustrated in FIGS. 4 and 5 for producing an intense substantially steady non-scanning laser beam employing a light tube.

FIG. 8 illustrates a similar cathode ray tube embodiment employing different types of semiconductor material producing different color laser radiation for producing a multicolor illumination of the target;

FIGS. 9a and 9b illustrate embodiments of the invention employing the device illustrated in FIG. 1 to read or write information from a moving strip of film;

FIG. 10 illustrates a cathode ray tube embodiment employing an array of light tubes immediately adjacent the strips of semiconductor for directing and focussing the light therefrom;

FIG. 11 illustrates details of a semiconductor strip in FIG. 10 and the light tubes aligned therewith; and FIG. 12 illustrates another use of an embodiment similar to that in FIG. 1 for illuminating the scenes moving past a vehicle so that the scene can be viewed or photographed.

Turning first to FIGS. 1 to 4 there are illustrated a number of aspects of the invention employing a variety of means for scanning and/or modulating an electron beam impinging upon a body of semiconductor material to produce some unusual effects on the laser beam issuing therefrom. FIG. 1 for example, illustrates a cathode ray tube structure, parts of which are enclosed by an evacuated envelope not shown. This structure includes an electron gun 1 ejecting a beam of electrons 2 which comes under the influence of deflecting fields such as produced by deflecting magnet 3 so that the beam is directed toward any selected portion of a substantially flat face of an elongated strip of semiconductor material 4. The body of semiconductor 4 is equipped with two optically flat substantially reflective faces 5 and 6 which form, at any position of the beam along the strip, an optical cavity between these faces. The distances between the faces 5 and 6 is preferably on the order of 20 to 200 microns and the cross section dimension of the electron beam in this direction is preferably the same so that substantially the whole of the optical cavity space between the surfaces 5 and 6 at any point along the strip 4 is subject to the impingement of high energy electrons.

The impinging high energy electrons produce an inversion of energy states within the semiconductor body immediately adjacent the point of impingement by creating hole-electron pairs and there ensues from this the emission and amplification by stimulated emission of an intense beam of light 7 which is transmitted through at least one of the optical faces, such as face 6, in the direction of the optical cavity toward a suitable target. In operation, the electron beam is caused to sweep the length of the semiconductor strip 4 by control signals applied from a deflection control 8 driving the deflection coil 3, while at the same time the intensity of the beam is controlled by signals from intensity control 9 which are applied to the electron gun. As a result, both intensity and position of the laser beam 7 are varied.

FIG. 1 shows structure producing a moving beam of light from a single elongated strip of semiconductor material. Substantially the same effect is produced if the strip is replaced by a plurality of small pieces or chips 10 of semiconductor arranged in a row 11 and swept by the electron beam. However, the light beam is discontinuous as the electron beam moves between adjacent chips.

FIGS. 2 and 3 illustrate techniques for producing a substantially intense modulated electron beam which, upon impingement with a body of semiconductor produces a modulated laser beam. In FIG. 2 a traveling wave tube type structure is provided including a cylindrical housing 11, a slow wave conducting structure 12 electron gun 13 ejecting a beam along the axis of the wave conducting structure (all enclosed within an envelope not shown) and a magnet encloses the housing for focusing the beam. In operation, high frequency energy is applied to the wave conducting structure 12 from a source 14, resulting in an exchange of energy between the beam and wave causing the beam to become modulated. The modulated beam is intercepted by one face of a body 16 of semiconductor material disposed within the envelope. At least two faces of the body 16 are substantially reflected and optically parallel so as to define an optical cavity therebetween. As a result, the laser radiation produced by the impinging modulated electron beam is amplitude modulated at the frequency of the source 14. The d.c. electron beam intensity is controlled by high voltage applied to the electron gun from a source 17 and thus, the semiconductor body 16 functions also as an electron collecting electrode in the tube.

The embodiment in FIG. 3 is similar to that in FIG. 2 except that the electron beam is modulated in a fashion similar to that which occurs in a klystron. This embodiment includes a wave reentrant cavity 21 which is fed energy from a high frequency source 22 so that the electron beam 23 from a gun 24 couples with the cavity and is modulated and upon striking a body of semiconductor material 25 produces an intense beam of laser radiation 26 modulated at the same frequency as the source. A high voltage source 27 provides potential to the electron gun to control the d.c. intensity of both the electron beam 23 and the laser beam 26.

A cathode ray tube structure for producing an intense light or a laser beam sweeping space in two dimensions is illustrated in FIGS. 4 and 5. This embodiment is somewhat similar to the structure illustrated in FIG. 1, but in addition has capacity for causing the beam to sweep in two orthogonal directions defining a raster such as a TV raster. These cathode ray tube devices will be referred to from time to time as "scanatron" devices. The cutaway view of the tube illustrated in FIG. 4 reveals an electron gun 35 including intensity control and accelerating electrodes 36 and 37 energized by suitable controls 38 and 39. The gun is located in the neck of an envelope 40 arranged so that the beam of electrons 41 issuing from the gun is readily deflected in orthogonal directions by deflecting electromagnet 42 enclosing the neck and controlled by signals from a beam deflection control circuit 43. The electron beam is directed toward a target including an array 44 of elongated strips or chips of semiconductor material such as illustrated in FIG. 1, arranged parallel to each other in step fashion similar to the stairs in a staircase. These strips such as 45 are preferably mounted in a block 46 of highly electrically and thermally conductive material which is in intimate contact with fluid such as liquid He or liquid N in a Dewar flask 47, thus maintaining the temperature of the semiconductor strips at cryogenic level. Such a low temperature level could also be maintained employing thermoelectric or thermomagnetic cooling devices in cascaded arrangement in intimate thermal contact with the semiconductor strips.

In operation, the beam 41 is caused to sweep the array of strips 44 preferably by sweeping the length of one strip and then moving to the next strip and sweeping the length of that and then moving to another, etc. The long edges of each of the strips are preferably reflective and optically flat so as to define an optical cavity therebetween. Thus, the area of a strip of semiconductor material on which the electron beam falls produces a laser beam of very intense, substantially coherent radiation narrowly directed in the direction of the optical cavity. In this embodiment all optical cavities formed along all the strips are preferably directed substantially parallel to each other. Thus, as the electron beam sweeps along each strip and from strip to strip, the laser beam is produced sweeping in synchronism with the electron beam and directed as illustrated by instantaneous positions of the laser beam 49a, 49b and 49c. The laser beam positions 49a, 49b and 49c illustrate the instantaneous position of the laser beam at enterposition, at the beginning, the middle and the end of a raster, each emanating from a different strip of semiconductor material.

As illustrated in FIG. 6a, the typical laser beam 49 emanates from a chip or strip of semiconductor 45 in the direction of the optical cavity defined between the reflective optically flat faces 51 and 52 of the strip. The laser beam 49 is subject to a certain amount of divergence which may be defined in two orthogonal directions represented by the two angles 53 and 54. The angle 53 in the plane of the strip, is on the order of only 0.3°; however, the divergence in the orthogonal direction represented by angle 54 is on the order of 3° and in some applications may be undesirable. This may be remedied by an array of cylindrical or lenticular lenses 55. The array of lenses 55 includes a separate lens aligned with and corresponding to each of the strips of semiconductor in the array 44.

The electron beam 41 is preferably of cross section dimension at least as great as the width of each of the strips of semiconductor. This will ensure lasering between the parallel optical reflecting faces 51 and 52 by providing electron-hole pairs along the entire optical path between the optical faces. This is quite feasible because the dimension of the strip of semiconductor material in the direction of laser radiation is between 20 and 200 microns. If the semiconductor material is GaAs, 50 kev electrons in the beam have an rms penetration depth of approximately 5 microns and thus, electron-hole pairs are formed in the GaAs material to a depth of about 5 or 10 microns and it is in this portion of the material that lasering action occurs.

In order to limit the area in which instantaneous lasering occurs, to a narrow portion along the length of the strip, it is desirable to shape the cross section of the electron beam as illustrated in FIG. 6b. Here the dimension "b" is preferably as great as the width of the semiconductor strip or about 20 to 200 microns while the dimension "a" may be substantially less. The shape may be oval, as shown, or rectangular. This can be accomplished by suitable electrodes added to the electron gun such as a beam forming mask used in charactron type cathode ray tubes.

The complete FIG. 4 illustrates one use of the beam scanning laser. A large lens system 56 is provided to focus the scanning laser beam on a screen 57 some distance away. When video signals are applied from the intensity control in synchronism with deflection signals applied to the deflecting coil, the laser beam directed to the target screen will produce thereon an image representative of the video signals. Thus, a TV type picture may be formed at the scan rate of commercial TV. It is estimated that the screen may be located at least as far as 100 feet from the tube and scanned at the rate of commercial TV producing thereon an image of many hundreds of square feet in dimension which can be readily viewed by human observers in a darkened atmosphere.

Another embodiment employing a scanatron device is illustrated in FIG. 7 and includes a substantially identical cathode ray tube to that shown in FIGS. 4 and 5 and with optical means for direction the scanning light or laser beam to a light tube which concentrates the beam producing a substantially continuous non-scanning intense beam of light. This includes a cathode ray tube envelope 60 enclosing an array 61 of strips or chips of semiconductor material such as 62 disposed on the inside face of the tube, an electron beam gun 63, deflecting coil 64 and deflection and intensity controls 65 and 66. The light beam 67 issues from the particular piece of semiconductor to which the electron beam is directed and moves to the various positions indicated by the broken line light paths as the beam sweeps the array. A lens system 68 directs light from any of these paths to one end of an optical light tube 69 which may be flared as shown or designed so that all the light paths define greater than critical reflection angle with the walls of the tube. Thus, the light which emanates from the cathode ray tube in substantially parallel rays spread over a substantial area due to the scanning action of the electron beam and size of the array of semiconductor pieces is concentrated to the cross section area of the light tube and emerges from the light tube as a substantially parallel light beam 70.

One advantageous use of the system in FIG. 7 is to provide a substantially steady, non-scanning, very intense beam of light. Since the electron beam scans the semiconductor pieces in the array very rapidly, it dwells only a brief interval (a few microseconds or less) on any particular area of the semiconductor material. Thus, the electron beam may be very intense and produce very intense light from the area during the interval. For example, the electron beam may be on the order of a milliampere or 10 to 100 kev and the current density exceed one ampere per square centimeter. These intensities far exceed those permissible when the electron beam is directed steadily to one area of a piece of semiconductor producing a substantially steady non-scanning beam. The lens system and light tube serve to direct the very intense scanning light beam along a single path so as to eliminate the scanning action and produce a more intense substantially steady light beam or laser beam than heretofore possible.

FIG. 8 illustrates an embodiment of a scanatron producing a multicolored or multiwave length light beam. Here, for example, the envelope 71 includes a neck enclosing three electron gun systems 72, 73 and 74 each including an accelerating electrode and an intensity control-electrode for accelerating and modulating three separate beams 75, 76 and 77, respectively, emanating from a single or multiple cathode 78. Each of the electron guns 72 to 74 are connected to separate control circuits 81 to 83, respectively. And, thus, each may be controlled by a different signal. However, the three electron beams 75 to 77 are simultaneously controlled by the same deflecting magnet 84 enclosing a portion of the envelope. Thus, the three beams are caused to sweep in unison the target structure 85 at the opposite end of the envelope.

The electron beam target 85 includes an array of strips or chips of semiconductor material arranged as the steps on a staircase (the figures show an array of strips). Adjacent strips are preferably of different type material so that when energized by one of the beams, the adjacent strips produce different color laser radiation. The electron beams are directed to the target 85 so that simultaneously they sweep different adjacent strips of semiconductor producing narrow laser beams of different color. The simultaneous laser beams are very closely spaced and, in fact, overlap by virtue of the slight divergence illustrated in FIG. 6a. Thus, at any instant, a composite laser beam of a plurality of different colors is produced which may be directed by a lens system to a target screen producing a moving multicolored spot thereon.

One suitable use of the scanatron device and system in FIG. 8 is to project colored TV on a screen. To accomplish this, a separate video signal corresponding to each of the primary colors is fed to the beam control circuits A, B, and C while at the same time synchronized sweep pulses are applied to the sweep magnet so that the electron beams 75 and 77 sweep out a TV type raster on the arrays of strips of semiconductor. For example, blue video signal is fed to control A, red video to control B and green to control C. Groups of three adjacent strips of semiconductor material such as 86, 87 and 88 are selected so that strip 86 produces blue light, strip 87 produces red light and 88 produces green light when energized by an electron beam. The blue, red and green laser beams 91, 92 and 93 from the strips 86, 87 and 88 respectively, form a composite multicolor beam which is directed to a viewing screen 94 by a lens system 95 producing a color TV picture thereon.

The colored TV picture may be formed with other well known arrangements of electron beam guns or a single electron gun energized by different types of video signals which incorporate color information. The three gun arrangement illustrated and described herein is only one example. In addition, the strips of different type semiconductor material arranged in a stair-like array could be replaced by rows of chips of different types of semiconductor arranged in a stair-like array and scanned by a number of electron beams as illustrated or by a single beam energized by a composite video signal.

Semiconductor materials composed of binary and tertiary compounds can be formed which produce laser wavelengths from about ten microns into the ultraviolet. The relatively long wavelengths between 7 and 25 microns can be produced with lead salts such as PbTe, PbSe, and PbS or $Hg_xCd_{1-x}Te$ alloys which have very small interband (conduction to valence) gaps and, thus, emit in the long infrared. Semi metals such as Bi and Bi-Sb alloys can be excited to emit even longer wavelengths on the order of eighty microns and these can be shifted by exposing the material to an intense magnetic field. Visible light over a range of colors is produced by a number of compounds some of which are listed in the following table:

| Compound | Wavelength A | Color |
| --- | --- | --- |
| CdS | 4930 | Blue |
| ZnSe | 4750 | Blue |
| ZnTe | 5620 | Green |
| CdSe | 7270 | Red |
| ZnO | 3740 | Violet |
| ZnS | 3330 | Violet |

Among the above list are some suitable for producing the blue, green and red laser beams described with reference to FIG. 8. For optimum operation to provide good colored TV, it may be desirable to shift the primary wavelength of one or more of the compounds to produce the desired effect. For example, a small amount of sulfide in CdSe can shift the 7270A. red light to shorter wavelength. Similarly, some Te in ZnSe to form the combination alloy $ZnTe_xSe_{1-x}$ will shift the 4750A. blue light toward the green. Thus, tertiary alloys can be formed to cover just about the whole infrared and visible spectrum.

It should be clearly understood that the radiation from any of the above mentioned compounds or materials will be altered, and sometimes substantially, by the existence of amounts of impurities in the material. For example, ZnS will radiate primarily red or pink instead of violet because of minute amounts of impurity and ZnSe will radiate yellow or green instead of blue. Thus, the choice of material to produce a specific band or color of light must necessarily follow considerable experiments and tests guided by the state of the art and the accuracy of prediction depends considerably upon the purity of the material selected.

Not all possible combinations of semiconductor alloys are useful or even possible, for use in the scanning beam laser, but many are. In the III-V series $GaAs_{1-x}P_x$ there are many producing red light and In-Ga-As alloys produce infrared from 3.1 to 0.54 microns. Also, alloys of InSb and InP and alloys of InAs and InP produce infrared.

The projecting systems employing the scanatron devices illustrated in FIGS. 4, 5 and 8 employ lens systems to reduce the laser or light beam divergence and project the image on a screen. An alternate type device is illustrated in FIGS. 10 and 11 wherein the laser beams emanating from each of the strips of semiconductor are conducted by a matrix of light tubes which conducts the sweeping light beam to an adjacent location where the image defined by the beam may be viewed or projected. Thus the light tubes in this embodiment preserve the scanning action of the light beam. FIG. 10 illustrates a cut away view of a scanatron including an envelope 101 enclosing a gun structure 102 from which a beam 103 issues and is deflected by the field from magnet 104 to sweep out a raster on an array of semiconductor pieces 105. The array includes a plurality of strips of semiconductor material such as strip 106 arranged in step fashion just as in the scanatron devices illustrated in FIGS. 4 and 8. Each of the semiconductor strips preferably includes two optically flat reflecting surfaces 107 and 108 defining an optical cavity. This is illustrated in the enlarged view of FIG. 11. Along one of these optical faces are disposed a row 109 of light conducting tubes or fibers such as fiber 111 which conduct the intense light or laser beam 112 generated within the optical cavity to a remote location. The row of light tubes emanating from the edge of each of the strips of semiconductor are arranged in a bundle 113 beyond the envelope of the tube and the relative positions of each of the light tubes are maintained in the bundle so that the raster of video information swept onto the array of strips of semiconductor by the electron beam is maintained at the end of the bundle and can be viewed directly or can be projected onto a viewing screen.

The light tubes or fiber optic system illustrated in FIGS. 10 and 11 serve not only to conduct the image to a remote point but also serve to focus and align the laser beam issuing from the strips of semiconductor and substantially eliminate the problem of beam divergence illustrated in FIG. 6a. This structure also eliminates problems which arise due to the inherent difference in cross section dimension of the laser beam at the tube envelope in proceeding from one end of the raster to the other. This is illustrated by the different sizes of the laser beams 49a, b and c in FIG. 4.

Other techniques for scanning in two dimensions with a light beam are illustrated in FIGS. 9a, 9b and 12. The systems in these figures illustrate only a few of the large number of uses of scanatron type devices. In these embodiments the light beam which may be coherent or incoherent depending upon the extent of lasering action, is caused to scan in a single dimension an object which is moving in a second dimension preferably transverse thereto. In FIG. 9a, for example, the envelope of the scanning light beam tube 115 is closed at the face end with a block 116 of preferably highly thermally conductive material to which a strip 117 or row of chips of semiconductor is mounted. The block is in intimate thermal contact with a sink of fluid such as He or N from a source 118; thus maintaining the semiconductor at cryogenic temperature levels to promote operating efficiency. The tube 115 produces a light beam 122 moving the direction of arrow 123 so that the beam scans a moving body such as film strip 125 which moves in the direction of arrow 126. A lens system may be interposed between tube and strip to control scan size. In operation, a drive mechanism 127 causes the film 125 to move at high speed in the direction of the arrow 126. Meanwhile, information or video signals are applied to the gun within the neck of the tube 115 from a beam intensity control 128 in synchronism with beam deflection signals from control 129 which are applied to the deflecting coil 130. The system as described to this point may serve to expose the film by illuminating it with the light beam so that the video information is recorded or written on the film.

The remainder of the system in FIG. 9a illustrates additional apparatus and equipment for reading the film and feeding information to a recorder. In accordance with this use, the beam intensity is maintained constant and passes through the film and is attenuated to an extent depending upon the transparency from point to point on the film. A mirror 137 directs the beam through a focusing lens system 140 to the cathode of a phototube 138 and the output at the phototube is fed to a recorder 139. In operation, electron beam blanking signals from intensity control 128 are fed to a sync control 131 from which a signal is derived or controlling the film drive 127, the deflection control 129 and the recorder 139 so that these three elements are synchronized with each other.

Another use of the scanatron for reading information from a moving strip of material is illustrated in FIG. 9b. Here the information is recorded in the form of areas of different reflectivity on the strip. This embodiment includes drive mechanism 141 driving a strip of such material 142 in the direction of an arrow 143. The intense light beam or laser beam 144 issuing from the scanning beam laser tube 145 is directed to a beam splitting mirror 146. This mirror transmits a portion 147 of the laser beam to the moving strip 142 and reflects a portion through a focusing lens system 150a to an optical bridge 148. The strip reflects a portion of the beam, determined by the reflectivity of the strip, through a similar lens system 150b to the bridge and the bridge produces a signal indicative of the difference in intensity between the two beams directed thereto. This difference signal is indicative of the information recorded as variations on reflectivity on the moving strip 142. The optical bridge includes, for example, two phototubes 149 and 151 each responsive to a different of the beams directed to the bridge. The outputs of these tubes are fed to a comparing circuit 152 which produces a signal indicative of the intensity difference between the beams and this signal is applied to recording apparatus 153. Depending upon the nature of the recording apparatus 153, a degree of synchronism between the moving strip 142 and the deflection signals from control 154 for controlling the beam scanning tube 145 is required. Accordingly, in some applications it is required to employ a synchronizing control circuit 155 which controls the drive mechanism 141, electron beam deflection control 154 and the recording apparatus 153.

Combinations of features of the systems shown in FIGS. 9a and b can be employed to provide a system employing at least one scanatron tube to copy an image or picture from one strip onto another. If, for example, the picture is opaque, it can be scanned by the beam from one scanatron tube as shown in FIG. 9b producing a video electric signal which is fed to another scanatron tube modulating the electron beam intensity therein. The light beam from the second tube is directed to a light sensitive strip exposing it to reproduce the same picture. The same thing can be accomplished employing a single scanatron tube and means for storing the video signals obtained then, later, feeding them to the tube which scans the light sensitive strip.

A camera and projection system accomplishing the same effects as a TV camera chain and kinescope can be provided employing the scanatron tubes which provide a beam scanning a two dimensional raster such as the types shown in FIGS. 4 to 8. Here a scene is illuminated by the intense scanning laser beam and means are provided for monitoring laser light reflected from the scene producing video signals. This means may be, for example, a phototube as a light sensitive diode to which laser light reflected from the scene is directed by a suitable optical system. These video signals and sweep pulses synchronized with those driving the scanatron are fed to a kinescope or another scanatron tube which displays the scene. Quite clearly, these and other copying, camera and projection systems can be formed employing features of the various embodiments already described.

The systems illustrated in FIGS. 9a and 9b do not require a scanning light beam of as great intensity as those shown in FIGS. 4 to 8 because the objects scanned are small and located in close proximity to the tube and detecting apparatus of high sensitivity can also be located close to the tube. FIG. 12 illustrates and embodiment employing a laser beam scanning a single dimension, the beam being of very high intensity. In this embodiment, the beam scanning laser tube 160 and its controls and power supply 161 are located in a vehicle moving in the direction of arrow 162. The high power laser beam 163 is directed to the passing scene 164, which may be, for example, the terrain below the moving vehicle. The combined motions of the beam in the direction of arrow 165 and the vehicle in the direction of arrow 162 accomplish a scan of the terrain illuminating a strip of the terrain below the vehicle. Photography or television apparatus aboard the same vehicle or a different vehicle may be employed to record or observe the illuminated terrain. In either case whether photography or TV equipment is employed in this observation, the speed and height of the vehicle, the angular rate of the laser beam and the size of spot illuminated by the beam should be coordinated.

This completes a description of a number of embodiments of the present invention wherein a flow of electrons is directed to at least one face of a body of semiconductor material preferably equipped with optically parallel reflecting surfaces defining an optical cavity enclosing at least a portion of the semiconductor material and in which the electron flow is modulated and/or deflected to different parts of the face of the body producing a beam of coherent electromagnetic radiation modulated and/or deflected in synchronism with the electron flow. These examples are made only by way of description, however, and do not limit the spirit and scope of the invention as set forth in the accompanying claims.

I claim:

1. A radiation generating device comprising a plurality of bodies of semiconductor material disposed in relationship to each other to define a three-dimensional array, means for providing a vacuum adjacent to said array, means for providing and for directing a beam of electrons through said vacuum to said array of sufficient intensity to produce elevated energy states in said material such that transitions from the elevated energy states to lower states occur accompanied by the emission of electromagnetic radiation from within the portion of any of said bodies of semiconductor material upon which said beam is incident and means for causing said electron beam to scan said array, thereby causing a corresponding shift in the position within said array of said portion in which said electromagnetic radiation is generated.

2. A device producing an intense laser beam comprising a plurality of bodies of semiconductor material arranged with respect to each other to define a plurality of rows which are staggered as the steps on a staircase, thereby forming a three dimensional array of said semiconductor bodies, means forming a plurality of optical cavities each enclosing at least a portion of each of said bodies of semiconductor material, means for providing a vacuum adjacent said bodies, means for providing and for directing an electron beam through said vacuum to said bodies of sufficient intensity to generate a laser beam at the point of incidence of said beam on any one of said bodies, means for directing said laser beam to a target and means for causing said electron beam to scan said bodies of semiconductor material while at the same time said electron beam is modulated in intensity so that said laser beam scans said target and is modulated in intensity, said laser beam scanning and modulation being in synchronism with said electron beam scanning and modulation.

3. A device producing an intense laser beam comprising a plurality of bodies of semiconductor material arranged with respect to each other to define a plurality of rows which are staggered as the steps on a staircase, thereby forming a three dimensional array of said semiconductor bodies, means forming a plurality of optical cavities each enclosing at least a portion of each of said bodies of semiconductor material, means for providing a vacuum adjacent said bodies, means for providing and for directing an electron beam through said vacuum to said bodies of sufficient intensity to generate a laser beam at the point of incidence of said beam on any one of said bodies, means for directing said laser beam to a target and means for causing said electron beam to scan said semiconductor bodies in a repeated sequence while at the same time said electron beam is modulated by video signals so that said laser beam scans said target producing an image thereon representative of said video signals.

4. A radiation generating device comprising a plurality of bodies of semiconductor material disposed with relationship to each other to define a plurality of rows staggered with respect to each other as the steps of a staircase, means for providing optical cavities enclosing at least a portion of each of said bodies of semiconductor material, means for providing a vacuum adjacent said bodies of semiconductor material, a plurality of light conducting tubes each with one end adjacent one of said rows, the other end of said tubes being gathered in a bundle preserving the relative positions of said first mentioned tube ends, means for providing and for directing a beam of electrons through said vacuum to said bodies of sufficient intensity to generate a laser beam at the point of incidence of said electron beam on said bodies of semiconductor material, means for modulating said electron beam with information signals, and means for causing said electron beam to scan said bodies in synchronism with said information signals whereby said other end of said bundle displays said information.

5. A device producing a substantially steady intense laser beam comprising at least one body of semiconductor material for providing an elongated surface of semiconductor material, means for providing at least one optical cavity enclosing at least a portion of said body adjacent said surface, means providing a vacuum adjacent said elongated face of semiconductor material, means for producing and for directing a beam of electrons through said vacuum to said face of semiconductor material, means for causing said electron beam to scan said face so that said beam dwells for only a brief interval on any particular portion of said face, the intensity of said beam substantially exceeding the beam intensity which would damage said face of semiconductor material if said beam were directed steadily to one portion of said face and sufficiently intense to produce laser radiation in the semiconductor material adjacent the portion of said face upon which said beam is incident, thereby producing a scanning beam of intense laser radiation and means for directing said scanning beam of laser radiation along a single path thereby producing a substantially steady non-scanning intense laser beam.

6. A device producing substantially steady intense laser beams comprising a plurality of bodies of semiconductor material arranged in spatial relationship to define a plurality of rows which are staggered with respect to each other as the stairs in a staircase, means for providing optical cavities enclosing at least a portion of each of said bodies of semiconductor material, means providing a vacuum adjacent said bodies of semiconductor material, means directing a beam of electrons through said vacuum to said bodies of semiconductor material, means for causing said beam to scan said bodies so that said beam dwells for only a brief interval on any particular portion of any particular one of said semiconductor bodies, the intensity of said beam substantially exceeding the beam intensity which would damage said semiconductor material if said beam were directed steadily to any one portion of one of said bodies and sufficiently intense to produce laser radiation in the portion of said bodies of semiconductor material upon which the beam is incident, thereby producing a scanning beam of intense laser radiation and means for directing said scanning beam of laser radiation along a single path thereby producing a substantially steady non-scanning intense laser beam.

* * * * *